Patented Mar. 21, 1933

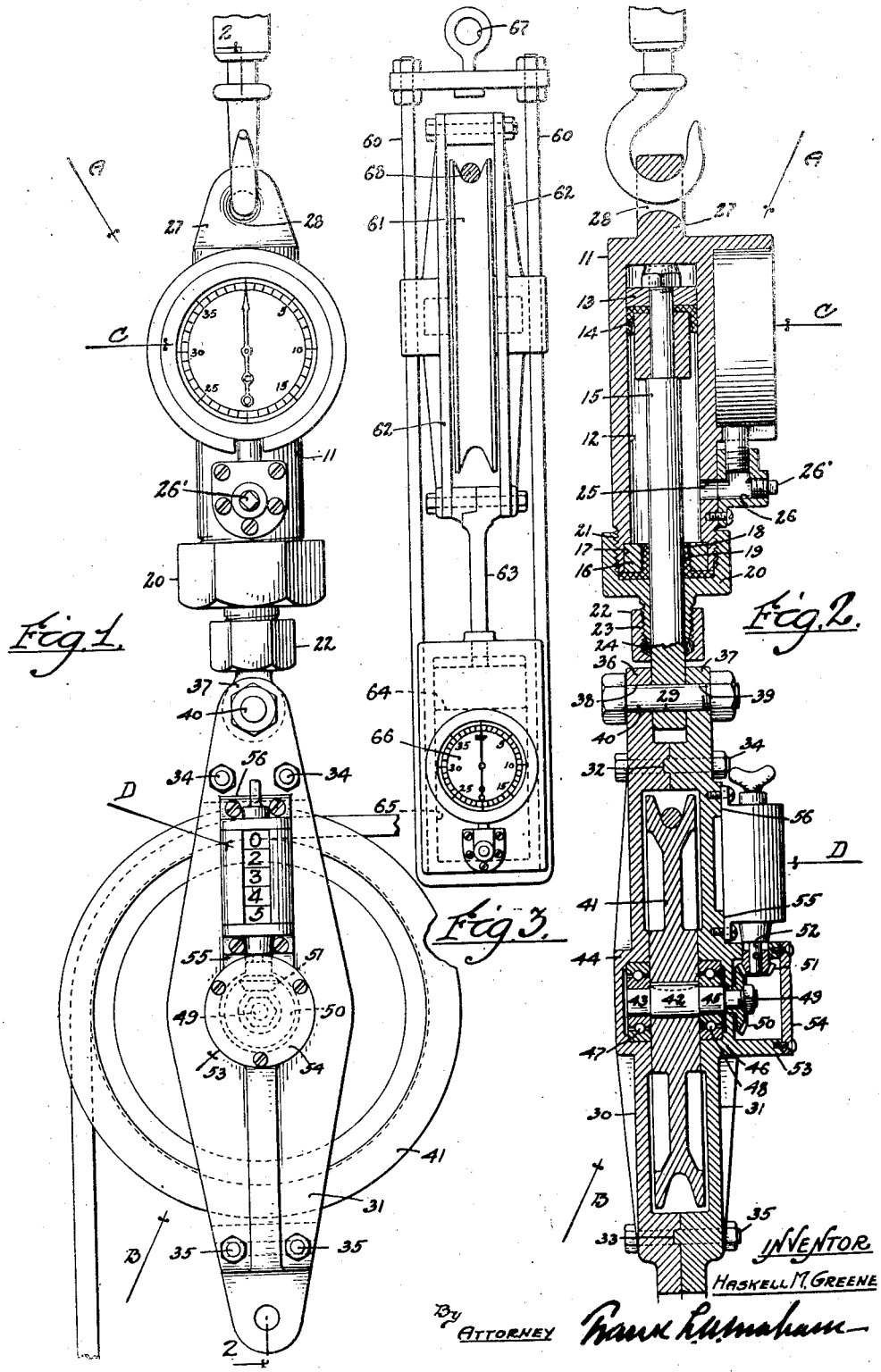

1,901,962

UNITED STATES PATENT OFFICE

HASKELL M. GREENE, OF WHITTIER, CALIFORNIA

DEVICE FOR INDICATING TENSION AND LENGTH OF LINES IN OIL WELLS

Application filed June 14, 1930. Serial No. 461,233.

This invention relates to a tension indicator and a depth indicator for use in oil well drilling and the like.

The primary purpose of this invention is to provide a device which may be used in conjunction with oil wells to indicate the tension of a line while being played out, together with means for accurately indicating the amount of line played out.
The device has general usefulness in wells of all types, but has been designed with special reference to shooting oil wells.

In shooting oil wells, the usual procedure is to make up a charge of explosive, and to lower the charge into the well to the point requiring shooting. In most cases the charge is exploded by a timed mechanism which, before lowering, is given a certain amount of time in which to explode. If anything unforeseen happens during the handling of the bomb, before or during lowering, an accident is a certain result. Another difficulty encountered has been that there is no definite way of determining the exact point at which the charge comes to rest; for instance, if the charge, in lowering, hangs up at any point during the downward progress, an indicator showing the amount of line played out would be valueless. If, on the other hand, the depth of the well were not accurately known, and it were required to explode a charge at the bottom of the well, difficulty would again be encountered in ascertaining with any degree of certainty if the charge had reached the bottom of the hole. This difficulty is well understood by those familiar with oil well drilling, since it is a known fact that the bottom of a bore hole is apt to fill up with mud and detritus that would tend to hold up a charge and without certain knowledge that the charge had reached the bottom, the explosion might be made to take place at a point above the bottom and cause serious damage to the well. In some cases it has been necessary to abandon wells after such inaccurate explosions. However, by lowering the charge on a line with a weight sufficient to penetrate such accumulation, and by equipping the line with an accurate tension indicator, the moment the weight actually hits bottom can be accurately observed. The charge may then be exploded with certainty that it rests on the bottom of the well. Other conditions arise which require that any obstruction in the upper part of a well bore be shot into the side of the hole in order to permit tools or drill strings to pass. Without knowledge of the exact location of the obstruction, it becomes a difficult problem to bring the charge alongside the obstruction with sufficient accuracy to blow it sideways out of the path of the well bore. Consequently, it becomes an object of this invention to provide a device having a mechanism which accurately indicates the tension on the line at all times. With such an arangement, it is a comparatively simple matter to observe any point during the progress of the lowered charge where a sudden change occurs in the tension on the line. This change in tension would indicate the point sought.

In conjunction with the tension indicator, I have also provided another indicator which shows the exact amount of line played out at all times. This arrangement clearly provides an apparatus whereby the exact depth of any change in tension may be determined. With such an arrangement, it is a simple process to locate and shoot any point wherein there is an obstruction in the well. It is, therefore, another object of this invention to provide a tension indicator and a footage indicator for use in lowering a line into a well.

The tension indicator may also be used in combination with a sand reel for indicating the exact point at which the bailer comes in contact with the liquid or the bottom of the well, and thus prevents playing out of useless line. Once having determined the liquid level, the sand line may be marked and the bailing proceed in the usual order, or the device may be used continuously to indicate each time the bailer contacts with the liquid.

Another use for the tension indicator and the footage indicator occurs in determining the exact depth of a well. In all instances, precise knowledge as to the depth of a well is valuable, but in some cases this has been practically impossible to obtain. My device may be used for such purposes, and accurately indicates the instant a weight suspended on a line comes into contact with the bottom of the well. The footage indicator may then be read and the exact depth of the well determined. This method has been found in practice to yield highly accurate results.

Another use of the device occurs in ascertaining the level of different fluids in a well; for instance, a well may have a slug of oil supported on a column of water, which water in turn rests upon a layer of gas. The tension indicator is so adjusted that it will show a change in tension as the weight passes from oil into water or water into gas. This is brought about by a difference in specific gravity of the different fluids which reacts to increase or decrease the resultant weight of the suspended load with the result that the change in tension in the suspension line indicates the dividing line between such fluids. The information thus obtained becomes highly valuable on certain occasions to avoid locating a pump in a gas pocket or in a water column.

Another application of my device consists in locating certain joints of pipe which require shooting. In shooting joints, the torpedo or the charge of explosive is provided with resilient extending fingers which are upwardly inclined on the side of the torpedo in a manner to slidingly engage the wall of the tubing as the charge descends. By calculating approximately the distance to the joint, and by observing the amount of line played out, the charge may be brought into close proximity or just below the joint. The charge is then raised until the fingers expand outwardly and engage the recess between adjacent sections of pipe. In this manner, the explosive is accurately located, and the force of the explosion is confined directly to the vicinity of the joint.

Other objects and advantages will be best appreciated from the description of the apparatus in conjunction with the drawing, in which—

Fig. 1 is a view of my device as it would be used to lower an object into a well;

Fig. 2 is a vertical section on line 2—2 of Fig. 1; and

Fig. 3 is a view showing an arrangement of my device for use as a tension indicator only.

Referring to the drawing, and particularly to Fig. 1, my device is seen to comprise two units; namely the tension indicating means designated A, and a footage indicating means shown at B. The two units are interconnected in a manner to operate conjointly and to simultaneously indicate the tension and the footage of a line lowered into a well. More specifically describing the unit A, it is illustrated as comprising a housing or casting 11 which is interiorly provided with a cylindrical chamber 12 which will hereinafter be referred to as the cylinder 12. Mounted within the cylinder 12 is a piston 13 having a conventional cup leather arrangement 14 adapted to slidably seal the piston 13 within the cylinder 12. The piston 13 is equipped with a rod 15 extending outwardly from the cylinder 12. Means is provided for closing the open end of the cylinder 12 and for packing around the rod 15, said means preferably consisting of a ring 16 mounted in a recess 17 within the lower end of the cylinder 12. The ring 16 is provided with a central opening 18 adapted to pass the rod 15 and also receive a portion of a gasket 19 disposed about the rod 15. The gasket 19 is held in place about the rod 15 and against the ring 16 by means of a closure cap 20 screw-threadedly mounted upon the lower end of the cylinder as shown at 21.

A second packing gland is provided about the rod 15, which consists of a cap 22 screw-threadedly mounted upon the closure cap 20, as shown at 23, and provided with a packing gland 24. The packing arrangement just described will be appreciated as providing a seal against any escape of fluid within the cylinder 12.

As a means of indicating any pressure put upon fluid in the cylinder 12 through tension in the rod 15, I have provided an opening 25 in the wall of the cylinder 12 connected in any suitable manner to a pressure gage designated at C; it being understood that any liquid operated pressure gage is suitable for the purpose described. It thus becomes clear that any tension put upon the rod 15 will react to compress a liquid, preferably oil, in the cylinder 12, which will, in turn, register a corresponding pressure upon the gage C. In order that the cylinder 12 and the gage C may be filled with a liquid and be calibrated to a zero reading preparatory to operating, I have provided an opening 26 below the gage C, which opening communicates directly with the opening 25 and is outwardly closed by a plug 26'. The upper end of the casting 11 is provided with a lug 27 having an opening 28 therein for purposes of supporting the device for use. The outwardly extending end of the rod 15 is formed in a flat eye, as shown at 29, for the purpose of attaching the footage indicator B.

More specifically describing the footage indicator, it is illustrated as comprising a frame composed of two members 30 and 31, the members being provided with an interfitting tongue and groove arrangement, as shown at 32 and 33, for properly aligning the said members.

The means for holding the two members in engagement consists of bolts 34 and 35. The members 30 and 31 are further provided with means on the upper end for attaching to the eye 29 of the rod 15, said means consisting of a pair of ears, shown at 36 and 37 adapted to span the eye 29, and equipped with holes 38 and 39, respectively, arranged to receive a bolt 40 passing through the eye 29 and the ears 36 and 37. This coupling will be recognized as providing a pivotally detachable connection between the two units. Mounted between the members 30 and 31 is a revoluble sheave 41 which is secured to a shaft 42 extending outwardly from both sides thereof. One end 43 of the shaft is mounted within a hub 44 in the member 30. On the opposite side of the sheave 41 the shaft 42 extends outwardly as shown at 45, and is rotatably mounted in a hub 46 of the member 31. As a means of providing the utmost accuracy to the device, I have provided ball-bearings 47 and 48 to support the ends 43 and 45, respectively. The end 45 of the shaft continues outwardly in a reduced portion 49 upon which is securely mounted a miter gear 50. The miter gear 50 in turn meshes with a companion gear 51 which is mounted upon a shaft 52 that, in turn, drives the indicating mechanism of the footage gage designated D.

As a means of providing a housing for the gears 50 and 51, I have formed upon the member 31 a hollow circular extension, as shown at 53. This, in turn, is covered by a plate 54 which provides a closed recess for the gears that may be packed with a lubricant.

The indicator D is mounted upon the member 31 by means of flat faces 55 and 56 formed on the member 31. It is thus evident that as the sheave 41 rotates, the gears 50 and 51 rotate accordingly, and the gear 51, in turn, rotates the shaft 52 which operates the indicator D. By correlating the periphery of the sheave 41 with the footage denoted by the indicator, an exact measurement may be obtained of any line run over the sheave. This is one of the objects sought in the invention. It is manifest that by connecting the unit B, whereby the exact measurement of line played out is known at all times, to the unit A, whereby the exact tension on the line at all times is indicated, that the objects sought in this invention are realized.

In Fig. 3 I have shown my device as it would be adapted for use as a tension indicator only. In this arrangement, I have provided a frame 60 having a sheave 61 rotatably mounted in a frame 62, which frame, in turn, is slidably mounted in the frame 60. The frame 62, in this instance, is directly connected to a rod 63 which operates a piston 64 in a cylinder 65 placed in the lower end of the frame 60. A gage 66 is directly connected with the cylinder 65 and indicates the pressure put upon the rod 63. The frame 60 is upwardly provided with an eyelet 67 for supporting the device in any manner desired. With this arrangement, a line 68 is run over the top of the sheave 61 and exerts a downward pressure on the sheave which, in turn, is transmitted to the liquid of the cylinder 65. The amount of pressure is correspondingly indicated directly upon the gage 66. This device finds general usefulness in connection with a sand reel, whereby it is desirable only to know the instant the bailer comes in contact with the liquid. It may also be used for all other purposes of the character described wherein an exact footage measurement is not required.

It will be noted that no description has been entered of the mechanism either of the tension gage or the footage indicator, such mechanisms being available in the conventional type, and any type which operates in the manner described is suitable for the purpose.

Although I have directed this description toward a specific embodiment disclosing my invention, I am aware that equivalents may be used throughout the structure particularly with reference to the fluid cylinder. In this respect, I intend that this disclosure shall include spring operated tension indicators together with all other equivalent mechanism. I am also aware that certain modifications and alterations of parts, together with a modified arrangement of parts, can be utilized to obtain equivalent results. I therefore reserve the right to all such modifications and alterations in the way of refinements that come within the scope of the disclosure and the purview of the appended claims.

I claim as my invention:

1. An organization of the character described embodying: a tension indicating gauge; a sheave adapted to support a line; means associated with said sheave for operating said gauge to indicate on said gauge tension in the line, said means including, a piston mounted in a cylinder, and adapted to be supported therein by a noncompressible fluid operably connected with said gauge; separate means operably connected to said sheave for indicating the length of line run over said sheave, said last mentioned means including a footage indicator; and gears operably connecting said indicator to said sheave.

2. An organization of the character described embodying: a housing; means for operably supporting said housing; a cylindrical chamber in said housing adapted to contain a noncompressible fluid; a piston reciprocably mounted in said chamber and adapted to be supported by said fluid; a rod connected to said piston and extending from said chamber; a gauge mounted on said housing and operably connected to said chamber; a frame; means for pivotally connecting said frame to said rod; a shaft mounted in said frame; a sheave secured on said shaft adapted to support a line rotatably mounted in said frame; and means operated by said shaft for indicating the length of line run over said sheave.

In testimony whereof, I have hereunto set my hand at Los Angeles, California, this 21st day of May, 1930.

HASKELL M. GREENE.